Nov. 20, 1962 R. N. CLOSE 3,065,420

SIGNAL TRANSLATION SYSTEM WITH INTERCONNECTED CHANNELS

Filed Sept. 15, 1960

2 Sheets-Sheet 1

INVENTOR
Richard N. Close
BY
Pennie Edmonds Morton Barrows & Taylor
ATTORNEYS

Nov. 20, 1962 R. N. CLOSE 3,065,420

SIGNAL TRANSLATION SYSTEM WITH INTERCONNECTED CHANNELS

Filed Sept. 15, 1960 2 Sheets-Sheet 2

INVENTOR
Richard N. Close
BY Pennie, Edmonds, Morton, Barrows & Taylor
ATTORNEYS United States Patent Office 3,065,420

Patented Nov. 20, 1962

3,065,420

SIGNAL TRANSLATION SYSTEM WITH INTERCONNECTED CHANNELS

Richard N. Close, Garden City, N.Y., assignor to Cutler-Hammer, Inc., Milwaukee, Wis., a corporation of Delaware Filed Sept. 15, 1960, Ser. No. 56,246

12 Claims. (Cl. 325—3)

This invention relates to signal translation systems and provides means for promoting the reliability thereof. It is particularly applicable to remote and inaccessible equipment intended to provide two or more relay communication channels. However, it may be found useful in other applications where reliability is important, such as in telemetry and command systems, etc.

At the present time communication or other types of signal translation equipment is often placed in remote, inaccessible locations. In such cases reliability is highly important. With the advent of space vehicles as communication relay stations or for other purposes, reliability is of even greater importance.

After the equipment has been designed to be as highly reliable as possible through the use of high quality components, conservative design, etc., redundancy is often employed to give further assurance of operation. Such redundancy may take the form of duplicating individual units in the system and connecting them in parallel so that if one fails, the other suffices to continue operation. Or, redundancy may take the form of providing a standby channel which is placed in operation only when the normal operating channel becomes unserviceable.

Paralleling of individual components or units is often not feasible from the standpoint of circuit performance. For example, the paralleling of two similar RF to IF converters will usually result in interference effects which are decidedly deleterious.

The use of standby channels normally requires that provision be made for bringing the standby channel into operation either automatically upon failure of the main channel, or by remote control. Either procedure requires additional equipment at the remote location, which may be undesirable from the standpoint of cost, added weight, etc., and further poses problems of reliability in the switchover equipment itself.

In some cases, where a number of channels are normally used, provision is made to switch signals from a defective channel to another channel so as to continue operation. If the switching takes place at the remote location, disadvantages arise similar to those in the switching of standby channels. If the transfer of signals is accomplished by an operator at, say, a ground station, one or more completely operative channels at the remote location are still required.

In many applications each channel at the remote location will have two or more stages connected in cascade. Thus each channel may be considered to have an input section and an output section connected in cascade. In a relay station the input section will commonly convert a received radio-frequency (RF) signal to an intermediate-frequency (IF) signal, and the output section will convert the IF signal to an RF signal of different frequency from the input RF for retransmission. In a telemetry system the input signal may be a video signal which is converted to an IF signal and then to an output RF signal. In a command system the input signal may be an RF signal which is converted to an IF signal and then to an output video signal which performs a control function.

As will be apparent, if either the input or output section of a given channel becomes inoperative, the channel as a whole will fail. With a plurality of channels, one may fail because of an inoperative input section and another because of an inoperative output section.

The present invention is directed to a signal translation system containing a plurality of channels having input and output sections, in which means are provided for continuing to allow the passage of a plurality of signals even though certain sections fail. For a two-channel system, operation may continue despite the failure of an input or output section of one channel, or the failure of an input section of one channel and the output section of the other. This may be accomplished without the necessity of switching at the remote location, and without unduly degrading performance under normal conditions when all sections are operative.

Broadly, the plurality of channels are interconnected at respective points between the input and output sections thereof, so that the output of each input section is supplied to the output sections of the same channel and at least one different channel. Advantageously the interconnections are between points at which IF signals exist. Also, advantageously, attenuating means are inserted in the interconnections. By employing suitable expedients, satisfactory operation under normal conditions may be obtained, and also operation under conditions of failure. In the latter case the overall system operation may or may not be somewhat degraded, but in any event will be preferable to total falure.

The invention will be further described in connection with specific embodiments thereof.

Figures 1, 2, 3, 4, 5:
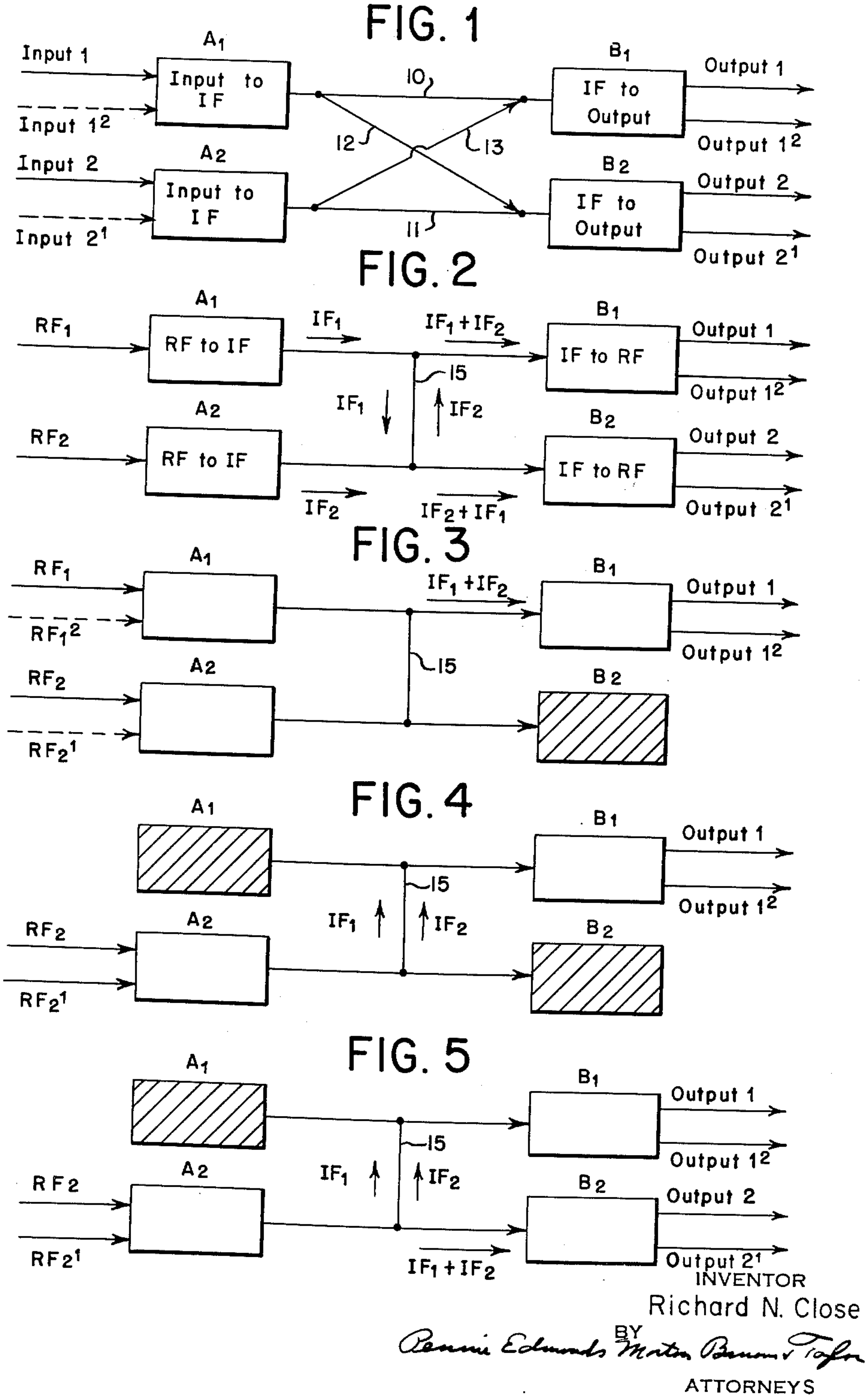
FIG. 1 is a block diagram illustrating a general arrangement in accordance with the invention.
FIG. 2 is a block diagram of a relay station in accordance with the invention.
FIGS. 3, 4 and 5 illustrate the operation of the arrangement of FIG. 2 under several conditions of failure.

Referring to FIG. 1, two main communication channels are shown. Channel 1 includes an input section $A_1$ and an output section $B_1$, directly connected in cascade through line 10. Channel 2 includes an input section $A_2$ and an output section $B_2$ directly connected by line 11. Input signals are supplied to respective input sections, and are designated Input 1 and Input 2. In a relay system the inputs will be modulated radio frequencies, but in other applications they may be of different type. For example, in telemetry applications the inputs may be video signals.

In the input sections $A_1$ and $A_2$, the input signals are converted to corresponding intermediate frequencies which are then supplied through lines 10, 11 to corresponding output sections $B_1$ and $B_2$. The IF signals are converted to corresponding output signals in the output units. The output signals corresponding to the input signals passing directly through the two channels are designated Output 1 and Output 2, respectively. In relay applications the output signals will be modulated radio frequencies. In other applications, such as in command systems, the outputs may be at video frequency and used to perform appropriate control functions.

In order to promote reliability in the event of failure of one or more sections, cross-connections 12, 13 are provided to feed the IF output of each input section to the output section of the other channel. The signal through line 12 will be converted to an output signal in section $B_2$, which is designated Output $2^1$. Similarly, the signal in line 13 will be converted to an output signal in section $B_1$ and is designated Output $1^2$.

The system is designed so that the IF signals fed to each output section are separable in frequency or time, or in some instances by differences in amplitude. Thus, the two outputs of a given output section may be distinguished.

Depending on the particular application, the signals normally passing through the main channels may be supplied only to the respective input sections, as indicated by the full line arrows, or both signals may be supplied to both input sections, as indicated by the dotted arrows. When both input signals are supplied to a single input section, they are normally maintained separable by employing different carrier frequencies or by time multiplexing.

The increased reliability in the case of failure of individual sections will be developed hereinafter, and additional features described.

Referring to FIG. 2, a radio relay system is shown. The input section $A_1$ in the upper channel is designed to receive an input radio frequency signal $RF_1$ and convert it to an intermediate frequency $IF_1$. The output section $B_1$ is supplied with the intermediate frequency $IF_1$ and converts it to an RF Output 1.

The lower channel contains input and output sections similar to those in the upper channel. However, the input signal $RF_2$ is assumed to be of different frequency from $RF_1$ and to be converted to an intermediate frequency $IF_2$ which is sufficiently different from the frequency of $IF_1$ to avoid excessive interference between the two signals when transmitted through a common signal path. Output signal 2 corresponds to input $RF_2$.

A cross-connection 15 is provided so that the intermediate frequency from each input section is fed to the output section of the other channel, as indicated. Thus, each output section will retransmit both input signals.

Considering output section $B_1$, the two intermediate frequency signals $IF_1$ and $IF_2$ will be retransmitted as RF signals Output 1 and Output $1^2$. These output RF frequencies will be different, and conveniently have a frequency separation equal to the separation of $IF_1$ and $IF_2$ which are fed to the output unit.

Similarly, the output signals from section $B_2$ will differ in frequency, conveniently by the frequency difference between the two intermediate frequencies fed thereto.

Advantageously the output band of $B_1$ will be substantially different from the output band of $B_2$, much greater than the difference between the two output frequencies of either section. Thus, the output of $B_1$ corresponding to the input signal $RF_2$ to channel 2 is designated Output $1^2$ to indicate that it is a different RF frequency from Output 2. Similarly, Output $2^1$ has a different RF frequency from Output 1, although the modulations are the same.

Referring now to FIG. 3, it is assumed that the output section $B_2$ in the second channel has become disabled. If the input signals are the same as in FIG. 1, both signals will be retransmitted by output section $B_1$, as indicated. Thus, a failure of one output section will not result in a failure of either communication channel.

If desired, however, the signal to one input section may have its RF frequency changed to lie within the bandwidth of the other, and to differ from the normal input signal in that channel by the selected separation of intermediate frequencies. The input RF signal to channel 2 may be shifted in frequency to lie within the bandwidth of input section $A_1$, as shown in dotted lines as input signal $RF_1^2$. The difference between this signal and $RF_1$ is equal to the selected difference between the two intermediate frequencies $IF_1$ and $IF_2$. Accordingly, both intermediate frequency signals will be delivered by section $A_1$ to section $B_1$, and retransmitted. Or, the input signal to the first channel may be shifted in RF frequency to $RF_2^1$ lying within the input bandwidth of section $A_2$ and differing from $RF_2$ by the difference in intermediate frequencies.

FIG. 4 illustrates a condition where the input section of one channel and the output section of the other channel have failed. Without the cross-connection 15, it will immediately be apparent that both channels would be lost. However, by shifting the channel 1 input to $RF_2^1$, both intermediate frequencies $IF_1$ and $IF_2$ are fed to output section $B_1$ and retransmitted.

FIG. 5 illustrates a condition where one input section $A_1$ has become disabled but both output sections are in operation. By shifting the channel 1 input frequency to lie within the range of $A_2$, both IF signals are fed to both output units $B_1$ and $B_2$ and retransmitted.

As will be apparent from FIGS. 3–5, the cross-connection 15 assures continued relaying of two signals despite the disabling of one input or one output section, or diagonal input and output sections. Two separate channels without the cross-connection would serve to maintain operation under the conditions shown in FIGS. 3 and 5, but not the condition of FIG. 4. Hence, a considerably greater degree of reliability is obtained by the cross-connection.

The bandwidths of the input and output sections are made sufficiently wide to accommodate two RF and IF signals having the selected separation, together with their modulations. This is ordinarily quite easy to accomplish.

As shown in FIGS. 2–5, the cross-connection 15 is a direct connection so that, with similar input and output sections and input signals of similar power, two intermediate frequencies of similar power are supplied to each output section under normal operating conditions. Thus, the available power of each output section is divided between the two output signals. This may or may not be disadvantageous, depending on whether factors limiting the overall signal to noise ratio are in the terminal ground equipment or in the remote relay equipment. Furthermore, in some instances the terminal receiving equipment may be designed to take advantage of two RF signals bearing the same signal modulation, say outputs 1 and $2^1$, in order to improve the overall signal to noise ratio.

To avoid significantly degrading the performance of the channels under normal operating conditions, in accordance with a further feature of the invention attenuation is introduced in the interconnections between channels. In this manner, when all sections are operating properly, each output section may be caused to retransmit a signal fed directly through the respective channel at a higher power level than a signal fed thereto from the input section of a different channel.

Figure 6:
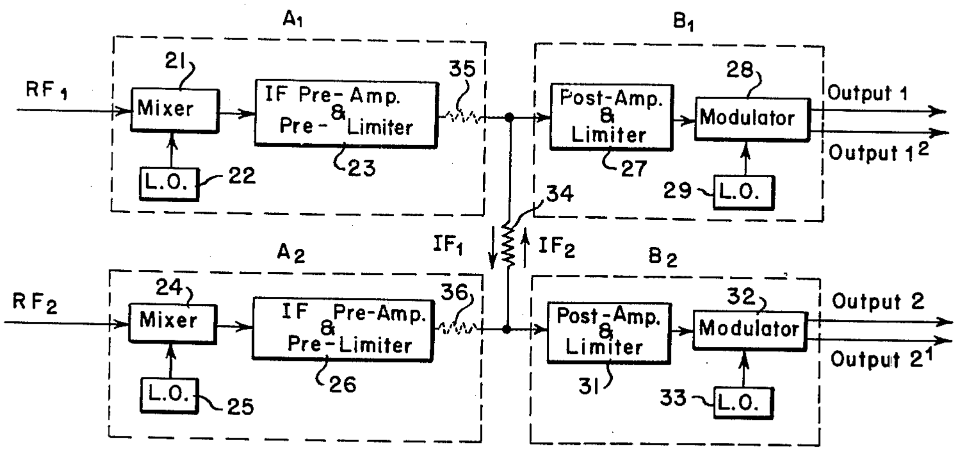
FIG. 6 is a block diagram similar to that of FIG. 2, but in greater detail and including attenuation in the cross-connection.

Referring to FIG. 6, an arrangement is shown in which attenuation is introduced in the cross-connection. Also, the input and output sections are adapted for use with phase-modulated (PM) or frequency-modulated (FM) signals.

In FIG. 6, section $A_1$ is shown as comprising a heterodyne mixer 21 supplied with the incoming channel 1 signal $RF_1$, and with the output of local oscillator 22. The resultant intermediate frequency signal $IF_1$ is amplified in preamplifier 23. Advantageously, preamplifier 23 is arranged to limit the signal output therefrom if the signal rises above a predetermined threshold level. Thus, if noise or other interfering signals are present in the output of section $A_1$, or are generated therein due to defective operation, so long as the pre-limiter is functioning the interference will not exceed the normal output signal level expected from section $A_1$. This materially reduces the possibility of interference from one input section affecting the output section of another channel. The attenuation between channels also aids in this respect.

Section $A_2$ contains units 24, 25 and 26 similar to those in $A_1$. However, section $A_2$ is designed to receive an input signal $RF_2$ in a different frequency band from $RF_1$, and to yield an output intermediate frequency signal $IF_2$ which differs from $IF_1$ as above discussed.

The output section $B_1$ in channel 1 includes a post-amplifier and limiter 27 designed to amplify the intermediate frequency signals fed thereto, and limit them to a predetermined level. The output of 27 is supplied to a modulator 28 which is also supplied with a fixed frequency from local oscillator 29. Modulator 28 may contain a power amplifier to yield modulated RF output signals of the desired power level. Advantageously, the limiter in 27 has a level selected to drive modulator 28 to its full power output level.

Output section $B_2$ contains units 31, 32 and 33 similar to those in $B_1$, but the frequency from local oscillator 33 is selected to yield RF output signals in a substantially different band from those of section $B_1$.

The cross-connection carrying the intermediate frequency signals includes an attenuator, here shown as resistor 34. The output impedances of preamplifiers 23 and 26 are represented by the dotted resistors 35 and 36, respectively. Assuming the output impedances to be the same, if the value of resistor 34 is made equal to either output impedance, an attenuation of 3 db is produced in transferring the IF signal from one channel to the other.

Thus, if the IF outputs of $A_1$ and $A_2$ are normally of the same amplitude, the intermediate frequency $IF_2$ supplied to output section $B_1$ will be 3 db lower than the intermediate frequency $IF_1$ supplied thereto. Because of the limiting action in unit 27, the RF power level for Output 1 will be only about 1.5 db below the level which would be produced with a single signal. On the other hand, the level for Output $1^2$ will be about 4.5 db below that which would be produced with a single signal. Similarly, the output levels of section $B_2$ for Outputs 2 and $2^1$ will be −1.5 db and −4.5 db, respectively, with respect to the power level available for a single signal.

A 1.5 db loss in power output will ordinarily not be important, but the loss can be further reduced by increasing the attenuation in the cross-section. Thus introducing attenuation in the interconnections between channels prevents serious degradation in the output signal levels under normal conditions.

With a failure of one output unit $B_2$ as shown in FIG. 3, and 3 db attenuation in the cross-connection as in FIG. 6, if the two input signals continue to be supplied to different input units $A_1$ and $A_2$, respectively, the outputs of the two signals from unit $B_1$ will be at different power levels in accordance with the above figures. However, if the RF frequency of the channel 2 signal is changed so that both input signals are fed to unit $A_1$, they will arrive at unit $B_1$ with equal power levels. Hence the outputs of unit $B_1$ will be at the same power level for both signals and will be approximately 3 db below the level for a single signal.

With the type of failure shown in FIG. 4, both IF signals must go through the cross-connection to unit $B_1$, and hence will be attenuated. However, by providing sufficient reserve gain in post-amplifier 27, full limiting can be obtained and both signals will be transmitted from unit $B_1$ with a loss of only 3 db over that available for a single signal.

While there is some decrease in power output under conditions of failure, this is far preferable to losing one or both signals. Under normal operating conditions with no failure, output signals of nearly the same power are available as would be obtained with entirely separate channels.

The amount of attenuation which can be employed in the cross-connection is limited by the reserve gain in the post-amplifiers 27 and 31.

Without the cross-connection, sufficient gain is required in the post-amplifiers 27 and 31 to amplify a normal signal from the input section of the respective channel to the limiting level of the limiters in 27 and 31. With pre-limiters in units 23 and 26, the minimum gain in 27 and 31 ordinarily would be that required to raise a signal at the prelimiter threshold levels to the post-limiter levels. Additional gain in 27 and 31 would ordinarily be provided to insure satisfactory post-limiting for signals somewhat below the pre-limiter threshold levels.

With the cross-connection and attenuation therein, advantageously additional reserve gain is provided in 27 and 31 to overcome the attenuation in the cross-connection under conditions of failure. That is, the reserve gain in each output section is advantageously as great as the attenuation in the cross-connection of signals fed thereto from the input section of a different channel, so as to be available when required. Although 3 db attenuation and reserve gain is very helpful, as will be apparent from the above discussion, more may be employed to advantage in particular applications.

It is desirable to select the separation of the intermediate frequencies $IF_1$ and $IF_2$ such that it is approximately equal to half the bandwith of the channels or somewhat greater. If this is done, the cross-modulation products between the two intermediate frequency signals will fall outside the bandwidth and thus serious interference between the two signals will be avoided. However, it is possible to separate the two intermediate frequencies by less than half the bandwith of the channels provided the increased cross-modulation is acceptable. Normally a guard band will be provided between the individual signals in a common signal path.

It will be noted that in the specific embodiments of FIGS. 2 and 6, the bandwidth of each channel is at least twice that required for the transmittal of the respective signals in the channels under normal operating conditions. Under conditions of failure, one or more sections are required to transmit two signals, thus utilizing twice the normal signal bandwidth, or somewhat more when a guard band is provided.

It is possible to supply two signals simultaneously to each of the two channels under normal operating conditions, thereby providing for the simultaneous relaying of four signals. In general, this is possible when a high signal-to-noise ratio exists for the several input signals and some deterioration in the signal-to-noise ratio can be tolerated in the retransmitted signals.

As an example, in FIG. 6 assume that the input signal-to-noise ratio is 20 db and the cross-connected signals are attenuated by 10 db in resistor 34. If two input signals are supplied to each channel and are converted to the same two intermediate frequencies $IF_1$ and $IF_2$, a signal-to-noise (or signal-to-interference) ratio of 10 db will still exist under conditions of no failure. That is, Output 1 from section $B_1$ will be modulated not only by the modulations on the input signal $RF_1$ but also those of $RF_2$, but the latter will be 10 db below the former. In many cases an output signal-to-noise ratio of 10 db may suffice. When a failure occurs of the type shown in FIG. 4, and only two signals are relayed, the excess gain in section $B_1$ will overcome the 10 db cross-connection attenuation. The resultant signal-to-noise ratio for the two surviving signals will be between 20 db and 10 db, depending on how much noise is still produced internally in section $A_1$.

A greater signal-to-noise ratio can be obtained under normal operating conditions if, instead of superimposing the two pairs of input signals on a single pair of intermediate frequencies, they are displaced so that each set occupies frequency spectrum normally provided as guard bands for the individual signals of the other set. Operation in these guard bands might normally produce intermodulation distortion products at one or more of the frequencies being utilized. However, if the cross-connected signals are attenuated sufficiently, say by 10 db, the intermodulation products will be reduced in magnitude and a signal-to-noise ratio of better than 10 db may be obtained during normal operation for the four desired signals.

Figure 7:
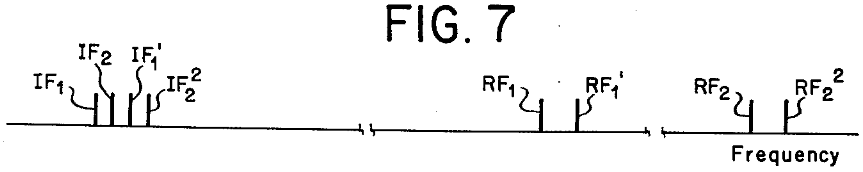
FIG. 7 illustrates a modification in the apparatus of FIG. 6.

FIG. 7 illustrates this type of operation. Assume that input signals $RF_1$ and $RF_1^1$ are applied to input section $A_1$ of FIG. 6, and that input signals $RF_2$ and $RF_2^2$ are normally applied to input section $A_2$. In section $A_1$ the two input signals are converted to respective intermediate frequency signals $IF_1$ and $IF_1^1$. In section $A_2$ the two RF signals are converted to intermediate frequencies $IF_2$ and $IF_2^2$. These are interleaved as shown. All four intermediate frequency signals will be converted to respective output RF signals in each of section $B_1$ and $B_2$. However, the outputs in one channel will be at a much higher power level for the two signals passing directly through that channel than for the two signals cross-connected thereto through the attenuating resistor 34. The signal-to-interference ratio for the two signals fed directly through a given channel will in general be better than that obtained if the two pairs of RF input signals are superposed on a single pair of intermediate frequencies. In particular instances, special types of transmissions may be employed to further improve the signal-to-interference ratio.

In FIGS. 1–6 the use of different intermediate frequencies in the cross-connection helps to avoid interference therebetween. Instead of relying on frequency difference for this purpose, it is possible to emploý time multiplexing.

Figure 8:
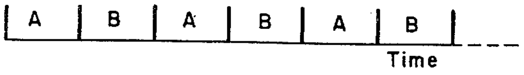
FIG. 8 illustrates a simple form of time multiplexing.

FIG. 8 shows a simple form of time multiplexing wherein time intervals or "slots" A and B alternate. It is assumed that the normal channel 1 signal is transmitted in the A slots and the normal signal for channel 2 in the B slots.

Figure 9:
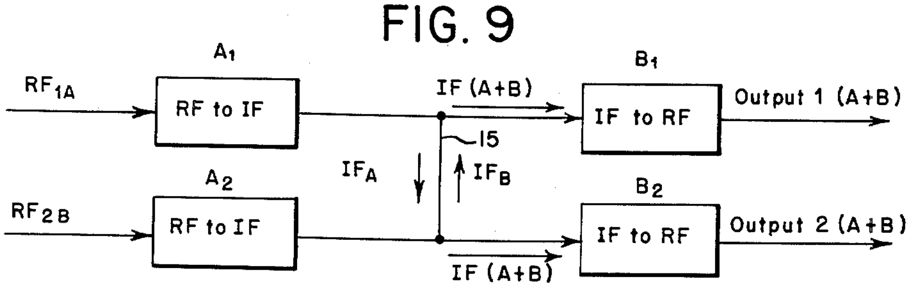
FIG. 9 is a block diagram of an embodiment of the invention utilizing time multiplexing.

FIG. 9 shows a two-channel cross-connected relay system wherein input units $A_1$ and $A_2$ are adapted to convert incoming RF signals to intermediate frequency signals, and the output units $B_1$ and $B_2$ are adapted to convert IF signals to RF signals for retransmission. The circuits used will be adapted to the type of modulation employed and may be similar to that described in connection with FIGS. 2 and 6 for similar types of modulation. However, the intermediate frequencies may be the same in both channels without producing cross-modulation, since they will be present in the cross-connection 15 during mutually exclusive time intervals.

In the specific embodiment of FIG. 9, normally the signal input to channel 1 is transmitted only during the A time slots, and the input signal is designated $RF_{1A}$. The input signal to channel 2 is normally transmitted only during the B time slots and is designated $RF_{2B}$. Because of the cross-connection 15, the output units $B_1$ and $B_2$ will retransmit both the A and B signals. With intermediate frequency signals of the same frequency, unit $B_1$ will retransmit a single RF carrier modulated with both A and B slot signals. Similarly, unit $B_2$ will transmit a single RF carrier modulated with both A and B slot signals. Commonly the RF carrier frequency of $B_1$ will differ from $B_2$.

Figure 10:
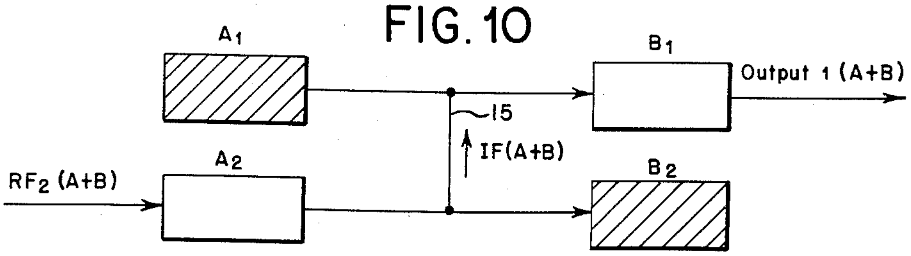
FIG. 10 illustrates the operation of the arrangement of FIG. 9 under one condition of failure.

FIG. 10 shows a type of failure similar to that of FIG. 4. In this case the RF input signal to channel 2 may be modulated by both the A and B time slot signals, designated $RF_{2(A+B)}$. Output unit $B_1$ will retransmit both modulations.

The operation of the system of FIG. 9 in the event of failure such as illustrated in FIGS. 3 and 5 will be clear from the foregoing and need not be explained specifically.

The specific embodiments of FIGS. 2–10 show relay stations for receiving and retransmitting signals. Instead of retransmission, the outputs of sections $B_1$ and $B_2$ could be demodulated to obtain video signals and used to perform control functions at the remote station, as discussed in connection with FIG. 1. Also, for telemetry applications, the input sections $A_1$ and $A_2$ could be designed to receive video signals produced at the remote location, as also discussed in connection with FIG. 1. The use of the invention in other applications will be clear to those skilled in the art from the above description. Also, although PM and FM modulation has been specifically described and has particular advantages, other types of modulation may be employed within the broad scope of the invention if desired.

Although only two channels have been shown in the specific embodiments, interconnection between a greater number of channels is possible, as will be understood.

Where desired, both different IF frequencies and time multiplexing may be employed to reduce cross-modulation resulting from the inter-connections.

I claim:

1. A signal translation system which comprises a plurality of signal translation channels having respective input and output sections, means in said input sections for converting input signals to respective intermediate-frequency signals means in said output sections for converting intermediate-frequency signals to respective output signals, and means normally interconnecting said channels at respective points between the input and output sections thereof for supplying the intermediate-frequency outputs of said input sections to the output sections of respectively different channels, the signals normally fed to the output section of each channel from the input sections of the same and a difftrent channel differing substantially in at least one of the following respects: intermediate-frequency, multiplex time-division occurrence.

2. A signal translation system which comprises a plurality of signal translation channels having respective input and output sections, means in said input sections for converting input signals to respective intermediate-frequency signals, means in said output sections for converting intermediate-frequency signals to respective output signals, means normally interconnecting said channels at respective points between the input and output sections thereof for supplying the intermediate-frequency outputs of said input sections to the output sections of respectively different channels, the signals normally fed to the output section of each channel from the input sections of the same and a different channel differing substantially in at least one of the following respects: intermediate-frequency, multiplex time-division occurrence; and attenuating means in said means interconnecting said channels.

3. A signal translation system which comprises a plurality of signal translation channels having respective input and output sections, means in said input sections for converting input signals to respective intermediate-frequency signals, means in said output sections for converting intermediate-frequency signals to respective output signals, and means interconnecting said channels at respective points between the input and output sections thereof for supplying the intermediate-frequency outputs of said input sections to the output sections of respectively different channels, the intermediate-frequencies of signals normally fed directly through said channels being substantially different and the effective intermediate-frequency bandwith of said output sections being greater than the frequency separation of the intermediate-frequency signals fed thereto from the input sections of the same and a different channel.

4. A signal translation system which comprises a plurality of signal translation channels having respective input and output sections, means in said input sections for converting input signals to respective intermediate-frequency signals, means in said output sections for converting intermediate-frequency signals to respective output signals, and means interconnecting said channels at respective points between the input and output sections thereof for supplying the intermediate-frequency outputs of said input sections to the output sections of respectively different channels, the signals normally fed to the output section of each channel from the input sections of the same and a different channel being time-multiplexed.

5. A signal translation system which comprises a plurality of signal translation channels having respective input and output sections, means in said input sections for converting input signals to respective intermediate-frequency signals, means in said output sections for converting intermediate-frequency signals to respective output signals, an amplifier and subsequent limiter in each of said output sections, the amplifier in the output section of each channel having a reserve gain in excess of the gain required to amplify a normal signal from the input section of the respective channel to the limiting level of the respective limiter, means interconnecting said channels at respective points between the input and output sections thereof for supplying the intermediate-frequency outputs of said input sections to the output sections of respectively different channels, and attenuating means in said means interconnecting said channels, said reserve gain in the amplifier in each channel being substantially as great as the attenuation in said attenuating means of signals fed thereto from the input section of a different channel.

6. A signal translation system which comprises a plurality of signal translation channels having respective input and output sections, said input sections having inputs for receiving radio-frequency signals of respectively different frequencies and including means for converting the signals to corresponding intermediate-frequency signals, means in said output sections for converting intermediate-frequency signals to respective output signals, and means normally interconnecting said channels at respective points between the input and output sections thereof for supplying the intermediate-frequency outputs of said input sections to the output sections of respectively different channels, the signals normally fed to the output section of each channel from the input sections of the same and a different channel differing substantially in at least one of the following respects: intermediate-frequency, multiplex time-division occurrence.

7. A signal translation system which comprises a plurality of signal translation channels having respective input and output sections, said input sections having input for receiving radio-frequency signals of respectively different frequencies and including means for converting the signals to corresponding intermediate-frequency signals, means in said output sections for converting intermediate-frequency signals to respective output signals, and means normally interconnecting said channels at respective points between the input and output sections thereof for supplying the intermediate-frequency outputs of said input sections to the output sections of respectively different channels, the intermediate-frequencies of signals normally fed directly through said channels being substantially different and the effective radio and intermediate-frequency bandwidth of said channels being greater than the frequency separation of the intermediate-frequency signals fed to the output sections thereof from the input sections of the same and a different channel.

8. A signal translation system which comprises a plurality of signal translation channels having respective input and output sectioons, said input sections having inputs for receiving radio-frequency signals of respectively different frequencies and including means for converting the signals to corresponding intermediate-frequency signals, means in said output sections for converting intermediate-frequency signals to respective output signals, an intermediate-frequency amplifier and subsequent limiter in each of said output sections, the amplifier in the output section of each channel having a reserve gain in excess of the gain required to amplify a normal signal from the input section of the respective channel to the limiting level of the respective limiter, means normally interconnecting said channels at respective points between the input and output sections thereof for supplying the intermediate-frequency outputs of said input sections to the output sections of respectively different channels, and attenuating means in said means interconnecting said channels, said reserve gain in the amplifier in each channel being substantially as great as the attenuation in said attenuating means of signals fed thereto from the input section of a different channel, the intermediate-frequencies of signals normally fed directly through said channels being substantially different and the effective radio and intermediate-frequency bandwidth of said channels being greater than the frequency separation of the intermediate-frequency signals fed to the output sections thereof from the input sections of the same and a different channel.

9. A radio relay system which comprises a plurality of relay signal channels for receiving signals in respective different frequency bands and retransmitting corresponding signals in respective different frequency bands, each of said channels having an input section for converting signals in the respective input frequency band to corresponding intermediate-frequency signals and an output section for converting said intermediate-frequency signals to corresponding radio-frequency signals for retransmission, and interconnecting means between said channels at respective points between the input and output sections thereof for normally supplying the intermediate-frequency outputs of said input sections to the output sections of respectively different channels, the signals normally fed to the output section of each channel from the input sections of the same and a different channel differing substantially in at least one of the following respects: intermediate-frequency, multiplex time-division occurrence.

10. A radio relay system which comprises a plurality of relay signal channels for receiving signals in respective different frequency bands and retransmitting corresponding signals in respective different frequency bands, each of said channels having an input section for converting signals in the respective input frequency band to corresponding intermediate-frequency signals and an output section for converting said intermediate-frequency signals to corresponding radio-frequency signals for retransmission, a pre-limiter in each of said input sections for limiting the amplitude of the intermediate-frequency output thereof to a selected level, an amplifier and subsequent post-limiter in each of said output sections, interconnecting means between said channels at respective points between the input and output sections thereof for normally supplying the intermediate-frequency outputs of said input sections to the output sections of respectively different channels, the signals normally fed to the output section of each channel from the input sections of the same and a different channel differing substantially in at least one of the following respects; intermediate-frequency, multiplex time-division occurrence; and attenuating means in the interconnecting means between said channels.

11. A radio relay system which comprises a plurality of relay signal channels for receiving signals in respective different frequency bands and retransmitting corresponding signals in respective different frequency bands, each of said channels having an input section for converting signals in the respective input frequency band to corresponding intermediate-frequency signals and an output section for converting said intermediate-frequency signals to corresponding radio-frequency signals for retransmission, a pre-limiter in each of said input sections for limiting the amplitude of the intermediate-frequency output thereof to a selected level, an amplifier and subsequent post-limiter in each of said output sections, interconnecting means between said channels at respective points between the input and output sections thereof for supplying the intermediate-frequency outputs of said input sections to the output sections of respectively different channels, and attenuating means in the interconnecting means between said channels, the amplifier in the output section of each channel having a reserve gain in excess of the gain required to post-limit a signal from the input section of the respective channel at the pre-limiter level thereof, said reserve gain of each amplifier being substantially as great as the attenuation in said interconnecting means of signals fed thereto from the input section of a different channel.

12. A radio relay system which comprises a plurality of relay signal channels for receiving signals in respective different frequency bands and retransmitting corresponding signals in respective different frequency bands, each of said channels having an input section for converting signals in the respective input frequency band to corresponding intermediate-frequency signals and an output section for converting said intermediate-frequency signals to corresponding radio-frequency signals for retransmission, a pre-limiter in each of said input sections for limiting the amplitude of the intermediate-frequency output thereof to a selected level, an amplifier and subsequent post-limiter in each of said output sections, interconnecting means between said channels at respective points bewteen the input and output sections thereof for supplying the intermediate-frequency outputs of said input sections to the output sections of respectively different channels, and attenuating means in the interconnecting means between said channels, the amplifier in the output section of each channel having a reserve gain in excess of the gain required to post-limit a signal from the input section of the respective channel at the pre-limiter level thereof, said reserve gain of each amplifier being substantially as great as the attenuation in said interconnecting means of signals fed thereto from the input section of a different channel, the intermediate-frequencies of signals normally fed directly through said channels being substantially different and the effective bandwidth of each channel being greater than the frequency separation of the intermediate-frequency signals fed to the output section thereof from the corresponding input section and the input section of a different channel.

References Cited in the file of this patent

FOREIGN PATENTS 1,212,716 France ---------------- Mar. 25, 1960